US009529979B2

United States Patent
Torgerson et al.

(10) Patent No.: US 9,529,979 B2
(45) Date of Patent: *Dec. 27, 2016

(54) PROVIDING CONTENT ITEMS FROM ALTERNATE SOURCES

(71) Applicant: Rhapsody International Inc., Seattle, WA (US)

(72) Inventors: Jeffrey Torgerson, Standwood, WA (US); Jon Maples, San Francisco, CA (US); Garrett Kamps, San Francsico, CA (US)

(73) Assignee: RHAPSODY INTERNATIONAL INC., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/612,848

(22) Filed: Feb. 3, 2015

(65) Prior Publication Data

US 2015/0150146 A1 May 28, 2015

Related U.S. Application Data

(63) Continuation of application No. 13/832,335, filed on Mar. 15, 2013, now Pat. No. 9,104,843.

(51) Int. Cl.
| | |
|---|---|
| *G06F 7/04* | (2006.01) |
| *G06F 17/30* | (2006.01) |
| *H04N 7/16* | (2011.01) |
| *G06F 21/10* | (2013.01) |

(52) U.S. Cl.
CPC ....... *G06F 21/10* (2013.01); *G06F 2221/0731* (2013.01)

(58) Field of Classification Search
CPC ........................... G06F 21/10; G06F 17/30017

USPC .................................................... 726/27
See application file for complete search history.

(56) References Cited

U.S. PATENT DOCUMENTS

| | | | | |
|---|---|---|---|---|
| 8,073,940 | B1* | 12/2011 | Richardson ......... | H04L 67/1097 709/200 |
| 8,856,903 | B2* | 10/2014 | Takahashi ............... | G06F 21/10 726/7 |
| 2006/0059508 | A1* | 3/2006 | Kamperman .......... | H04N 7/163 725/31 |
| 2008/0235580 | A1* | 9/2008 | Gonze ................. | G06F 9/44526 715/700 |

(Continued)

OTHER PUBLICATIONS

Rakesh Mohan; Adapting Multimedia Internet Content for Universal Access; IEEE Transactions on Multimedia, vol. 1, No. 1, Mar. 1999; p. 104-114.*

*Primary Examiner* — Monjour Rahim
(74) *Attorney, Agent, or Firm* — K&L Gates LLP

(57) ABSTRACT

Systems and methods for providing content items to users. A computer system may provide to a first user an indication of a plurality of available content items. The computer system may receive from the first user an indication of a first content item selected from the plurality of content items. The computer system may determine whether a content provider service associated with the computer system is authorized to stream the first content item to the first user. When the content provider service is not authorized to stream the first content item to the first user, the computer system may identify an alternate source for the first content item. The computer system may initiate playback of the first content item to the first user from the alternate source.

19 Claims, 7 Drawing Sheets

(56) References Cited

U.S. PATENT DOCUMENTS

2008/0235733 A1* 9/2008 Heie ................ H04N 7/163
                                                725/46
2014/0052872 A1* 2/2014 Varoglu ........... H04L 65/4084
                                               709/231
2014/0208360 A1* 7/2014 Kardatzke ........ H04N 21/482
                                                725/48
2014/0283114 A1* 9/2014 Nastacio .......... G06Q 50/182
                                                726/27

* cited by examiner

PROVIDING CONTENT ITEMS FROM ALTERNATE SOURCES

This application is a continuation of U.S. patent application Ser. No. 13/832,335, now U.S. Pat. No. 9,104,843, filed on Mar. 14, 2013 and entitled "PROVIDING CONTENT ITEMS FROM ALTERNATE SOURCES," which is incorporated herein by reference in its entirety.

BACKGROUND

This application generally relates to providing content items, such as audio tracks to users from alternative sources.

A proliferation of content provider services gives users access to all types of digital content including, music, movies, books, etc. Typically, a content provider service obtains license rights to a library of digital content. A user subscribes to the content provider service to receive content items, either individually or bundled together (e.g., by genre) via a stream. Users receive the content items via various different types of user devices including, for example, mobile devices, other computers, network-enabled stereo receivers, etc. Users are charged according to many different types of payment methodologies including, for example, periodic subscription charges, charges by content item, charges by unit time, etc. Traditional search engines and similar tools allow users to search libraries of available content to find content items for viewing, listening and/or downloading.

DRAWINGS

Various example embodiments are described herein by way of example in conjunction with the following figures, wherein.

DESCRIPTION

Figure 1:
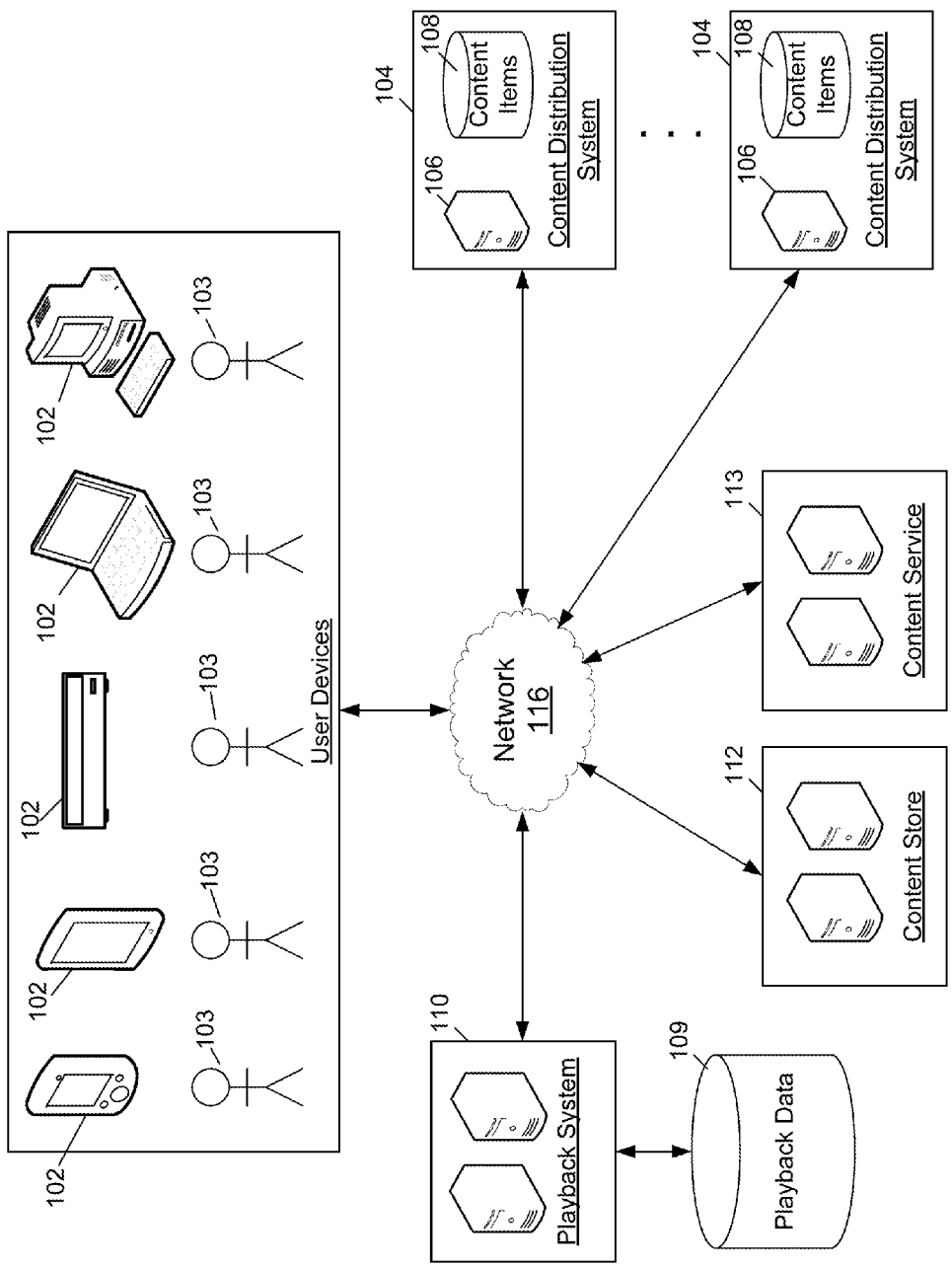
FIG. 1 is a block diagram showing one example embodiment of an environment for implementing systems and methods for providing content items from alternative sources.

Various embodiments are directed to systems and methods for providing content items from alternate content item sources. It is often a challenge for content provider services to obtain license rights to a comprehensive library of digital content. For example, to stream audio track content items, the content service provider must negotiate license arrangements with each individual record label. Even if agreements with all record labels can be reached, individual artists sometimes delay release of their materials to content provider services or prevent release altogether. As a result, users of content provider services are presented with perceptible holes in the available digital content.

To address this situation, various embodiments are directed to computer system and methods for identifying and providing content items from alternative sources. In many cases, rights-holders object may choose not to license a content item directly to a content provider service for distribution to many users, but does choose to license the content item in other contexts. Examples of other licensing contexts may include, for example, individual purchase of an audio or video medium comprising the content, purchase and download of a digital copy of the content item either to a user device or to a digital locker or other cloud location accessible to the user from multiple user devices, etc. In various embodiments, the content provider service leverages these additional licensing methods to provide users (e.g., individual users) with content items that would not otherwise be available through the content provider service.

In various embodiments, a computer system associated with the content provider service provides users with an indication of a plurality of available content items. The plurality of available content items may include content items that the content provider service is authorized to stream to its users. Such content items may make up the digital content library. The plurality of available content items may also include additional content items that are accessible to the content provider service. In some embodiments, the additional content items, as described herein, are accessible to the content service provider only on behalf of individual users. For example, the additional content items may include content items stored at a user's associated user device, content items that are stored on behalf of the user at a digital locker service and/or content items that are available for purchase on behalf of the user.

Reference will now be made in detail to several example embodiments, examples of which are illustrated in the accompanying figures. Wherever practicable, similar or like reference numbers may be used in the figures and may indicate similar or like functionality. The figures depict example embodiments of the disclosed systems (or methods) for purposes of illustration only. One skilled in the art will readily recognize from the following description that alternative example embodiments of the structures and methods illustrated herein may be employed without departing from the principles described herein.

FIG. 1 is a block diagram showing one example embodiment of an environment 100 for implementing systems and methods for providing content items from alternative sources. The environment 100 comprises one or more playback systems 110, one or more content store systems 112, one or more content service systems 113, one or more content distribution systems 104 and a plurality of user devices 102. Each user device 102 may be associated with a user 103. For example, a user 103 may own, lease, or otherwise have rights to use his or her associated user device 102. The user devices 102 may receive various content items and/or user interfaces from and/or through other systems 104, 110, 112, 113 of the environment 100 and provide the content items to the associated user 103, for example, as described herein. User devices 102 may comprise any type of network-enabled computer device that may be utilized by a user to receive and/or view content items. Examples of user devices include smart phones, tablet computers, laptop computers, desktop computers, network-enabled stereo receivers, etc. In some example embodiments, each user 103 is associated with a subscription account to one or more content provider services. It will be appreciated, however, that subscription accounts may be associated with user devices 102 in addition to or instead of being associated with users 103. In some embodiments, subscription accounts may also be associated with a geographic location or area, for example, the primary geographic location or area from which the user 103 and/or user device 102 contacts the playback system 110, as described herein.

Content provider services may be embodied by one or more playback systems 110, which may operate in conjunction with one or more content distribution systems 104. The playback system 110 may receive a request for a content item from a user 103 (e.g., via a user interface). In response to such a request, the playback system 110 may authenticate the user 103 and/or associated user device 102 to determine that the user 103 and/or the user device 102 has an active subscription that entitles the user 103 (and/or device 102) to access the requested content item. Provided that the authentication is successful, the playback system 110 may cause the requested content item to be provided to a user device 102 associated with the requesting user 103. For example, the playback system 110 may request that the content item be transmitted to the user device 102 by a content distribution system 104. Content items may be transmitted from a content distribution system 104 to a user device 102 in any suitable manner. For example, the content items may be transmitted via a secure communication channel formed between the content distribution system 104 and the user device 102 such as a transport layer security (TLS) or secure socket layer (SSL) channel. Also, for example, some content items may be individually encrypted during communication or transmitted in the clear. It will also be appreciated that content items may be provided to user devices 102 as discrete files or units or as part of a stream of content.

The playback system 110 may be programmed to implement various tools allowing users 103 to search available content items provided via a user interface. Examples of such tools may include search engines, play lists and radio stations. Search engines allow users 103 to locate content items according to any suitable searching methodology such as, for example, key word searches, searches by genre, searches by content item type, etc. Play lists may be lists of content items, for example, stored at playback systems 110. A play list may be created automatically, created by editorial staff of the content service provider and/or created based on input from a user device 102. Play lists may be available to all users 103, only to originating users 103, to select users 103, etc. In some embodiments, users 103 have associated user play lists. User play lists can be play lists that the user 103 generated and/or selected to be associated with the user's account. In some embodiments, user play lists may be selected and associated with a user's account automatically (e.g., by the playback system 110). A radio station may comprise a flow of content items generated, for example, by a playback system 110 and, for example, streamed to one or more users. The content items making up a radio station flow may be repeated and/or continuously updated (e.g., by the playback system 110). Specific content items may be included in a radio station flow or may be selected based on one or more common characteristics (e.g., similarity to a set of user selected content items, a common genre, a common artist, a common theme, etc.). In addition to indications of content items, user play lists may also include indications of radio station flows.

In some embodiments, the playback system 110 comprises a data store 109 comprising play back data. The playback data may include some or all of the content items that may be provided to users 103. For example, in some embodiments, the playback system 110 partially or completely provides the content items directly to the users 103 thus replacing some or all of the functionality of the content distribution systems 104. The data store 109 may also comprise user storage 136 (FIG. 2) that may include various content items associated (e.g., exclusively associated) with particular users.

The content distribution systems 104 may comprise one or more data stores 108 comprising content items and a server or other computer device 106 for processing requests. In various example embodiments, the playback system 110 utilizes multiple distributed content distribution systems 104 as shown. Some or all of the content distribution systems 104 may be mirrors of one another located at disparate geographic and/or network locations. For example, the playback system 110 may balance the loads of various content distribution systems 104 by directing requests to transmit content items to different content distribution systems 104 based on geographic and/or network proximity between the requesting user device 102 and the various content distribution systems 104, loads on the content distribution systems 104, etc. In some embodiments, the content distribution systems 104 may be operated by a third-party vendor of the content provider service such as, for example, LIMELIGHT NETWORKS. For example, the third-party vendor or associated system may perform the load balancing described herein above.

In some embodiments, the environment 100 also comprises one or more content store systems 112. Content store systems 112 may be operated by content stores that offer content items for sale to individuals, such as individual users 103. Content stores, such as ITUNES, AMAZON MP3, GOOGLE MUSIC, etc. Different content store operate under different pricing schemes. For example, some content stores may charge individuals on a per-content item basis. Also, some content stores may offer individuals a predetermined number of content items over a month or other period in return for a periodic fee.

The environment 100 may also comprise one or more content service systems 113. Content service systems 113 may be operated by content services or digital locker services that offer individuals, such as individual users 103, with remote storage of content items. Examples of content or digital locker services include, GOOGLE PLAY, AMAZON CLOUD PLAYER, ITUNES MATCH, etc. To use a content service, an individual may upload, and or provide an indication of, content items that are stored on the individual's user device 102. The content service system 113 subsequently allows the individual to access the uploaded content items remotely from various different user devices 102. In some embodiments, content service systems 113 are associated with content stores and may allow individuals to purchase content items and store them directly to the content service system 113.

The various components 102, 104, 110, 112, 113, etc. of the environment 100 may communicate with one another via a network 116. The network 116 may be any suitable type of wired, wireless, or mixed network and may comprise, for example, the Internet, a local area network (LAN), a wide area network (WAN), etc. In some example embodiments, some or all of the functionality for implementing a content provider service may be consolidated in a single system. For example, any combination of the playback system 110 and/or the various content distribution systems 104 may be consolidated into one or more single systems (e.g., at a common geographic location).

Figure 2:
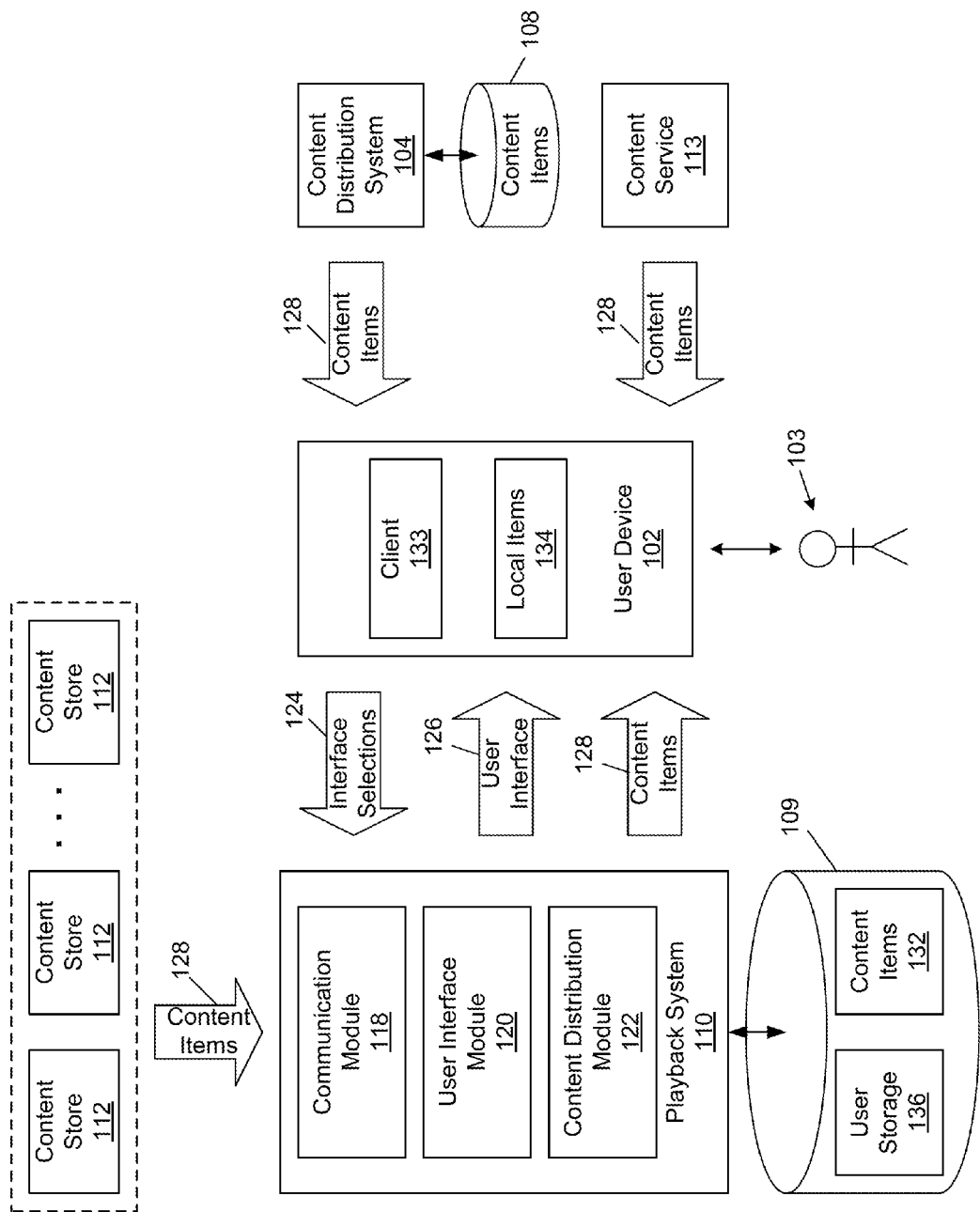
FIG. 2 is a block diagram showing one example embodiment of a playback system of the environment of FIG. 1 in communication with a user device and a content distribution system.

FIG. 2 is a block diagram showing one example embodiment of a playback system 110 in communication with a user device 102 and a content distribution system 104. The playback system 110 is programmed to execute example functional modules 118, 120, 122. A communication module 118 may be programmed to facilitate communication between the playback system 110 and various other components of a content provider service such as, for example, content distribution systems 104, a content store systems 112, content service systems 113, etc. A user interface module 120 be programmed to generate a user interface 126 and provide the interface 128 to users 103 (e.g., via the associated user devices 102). The interface 128 may provide the users 103 with indications of available content items 128, including content items from alternative sources, as described herein. A content distribution module 122 may facilitate the distribution of the selected content items. For example, the content distribution module 122 may instruct at least one of the content distribution systems 104 to provide the content items 132 to the user 103 (e.g., via the communication module 118). Also, in some embodiments, the content distribution module 122 for distributing content items 132 directly from the playback data store 109 to the user 103. Also, in some embodiments, the content distribution module 122 may comprise functionality for identifying alternate content item sources and providing content items from alternate sources to the user 103.

In some embodiments, the playback data store 109 comprises various databases 132, 136 comprising data used by the playback system 110. User storage 136 may comprise various storage portions uniquely associated with individual users. Storage portions associated with a user 103 may comprise various data describing the user such as, for example, account data, log-in information, usage logs, etc. In various embodiments, storage portions associated with some users 103 also comprise content items for provision to the specific user 103, as described herein.

The example user device 102 shown in FIG. 2 comprises a client 133 and optional local content items 134. The client 133 may facilitate communications with the playback system 110. For example, the client 133 may receive and display the user interface 126 from the playback system 110 and receive and transmit interface selections 124 from the user 103. In various embodiments, the client 133 also executes the playback of content items 128 at the user device 102. Local content items 136 may comprise content items stored at the user device 102. These may include content items that are derived from tangible media owned by the user 103, content items purchased from a content store system 112, content items pushed to the user device 102 by the playback system 110, as described herein, etc.

FIG. 2 also illustrates various content store systems 112, an example content distribution system 104 and an example content service system 113. The content distribution system 104 may stream content items 128 from the digital content library to the user device 102, as described herein, under instructions from the playback system 110. The content store systems 112 are shown providing content items 128 to the playback system 110. Such content items 128 may be purchased by the playback system 110 and stored in association with the user 103, as described herein. In addition or instead of being stored, content items 128 purchased from the various content stores 112 may be streamed and/or pushed to the user device 102. The content service system 113 may provide content items 128 to the user device 102, for example, in response to a request from the playback system 110, as described herein. In some embodiments, the content service system 113 may provide the content items 128 through the client 133, as described herein.

Figure 3:
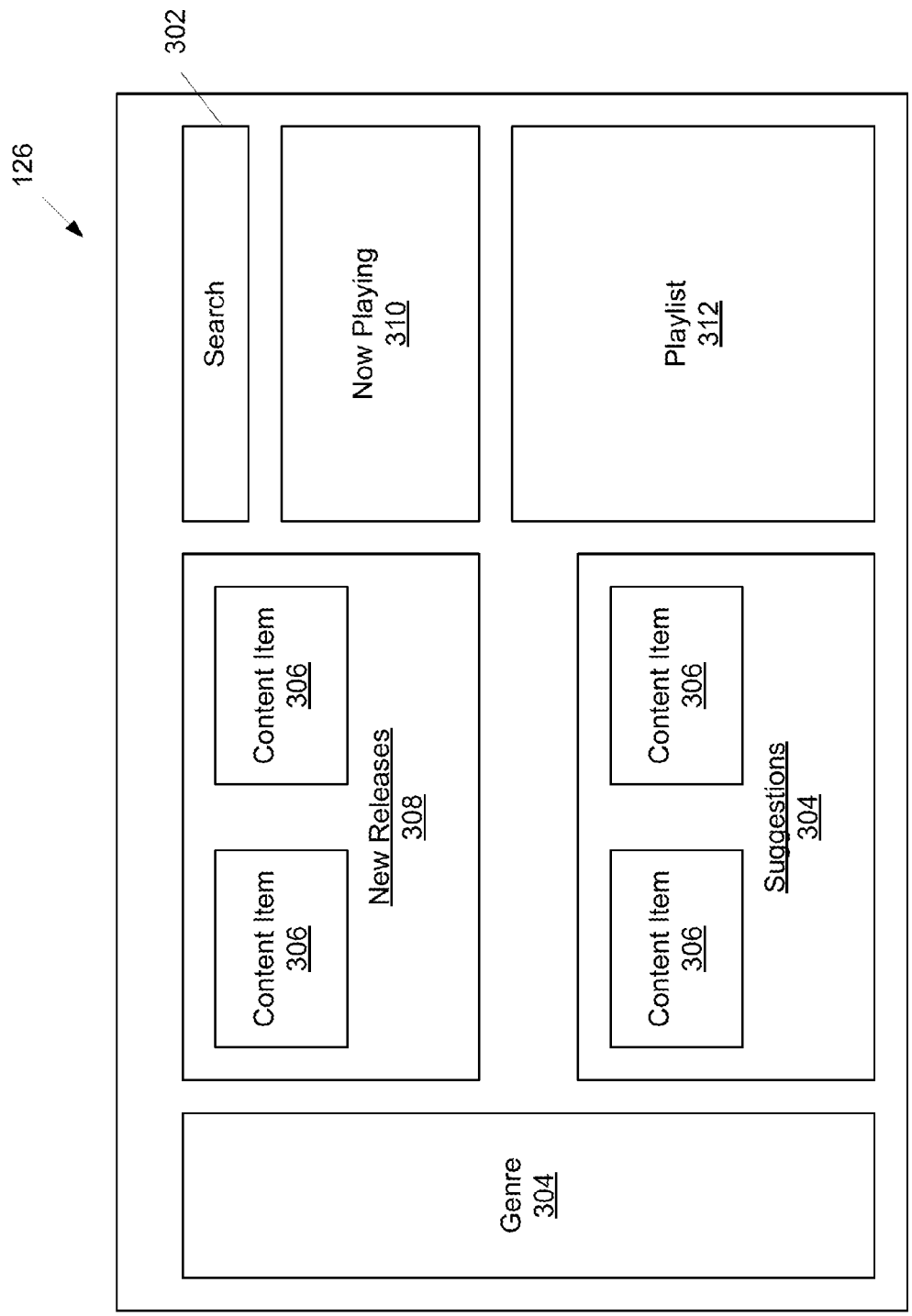
FIG. 3 is a block diagram showing one embodiment of a user interface screen that may be provided to a user.

FIG. 3 is a block diagram showing one embodiment of a user interface screen 300 that may be provided to a user 103. For example, the interface screen 300 is but one example of an interface 126 that may be generated by the user interface module 120, provided to the user device 102 and displayed to the user, e.g., via the client 133. The screen 300 comprises various fields allowing the user 103 to search for, find, and play content items. A Search field 302 may receive one or more text strings from the user 103. In response to the text strings the user device 102 (e.g., via the playback system 110) may provide the user 103 with content items that match the received search string. A Genre field 304 may comprise lists of content item genres. The user 103 may select a genre from the genre field 304 to cause the user interface 126 to display content items belonging to the selected genre and/or provide the user 103 with functionality for searching within the selected genre. A Suggestions field 304 may comprise icons 306 indicating content items selected (e.g., by the playback system 110) specifically for the user 103. For example, the Suggestions field 304 may be populated with content items that are similar to content items that the user 103 has previously received. A New Releases field 308 may comprise icons 306 corresponding to content items that are newly released and/or newly available through the content provider service. A Now Playing field 310 may indicate various data about a content item that is currently being played-back to the user 103 including, for example, the name of the content item, any visual art associated with the content item, if the content item comprises video, an indication of the video, an indication of the position of the playback, etc. A Playlist field 312 may comprise indications of other content items that the user 103 has selected for future listening. It will be appreciated that the screen 300 is but one example screen that may be provided as a part of the user interface 126.

Figure 4:
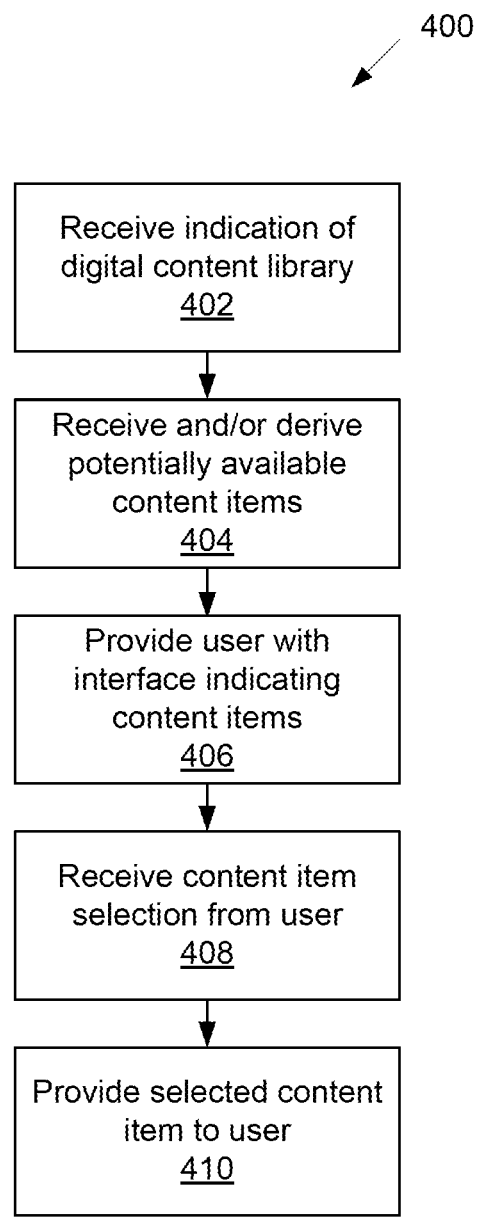
FIG. 4 is a flowchart showing one embodiment of a process flow that may be executed by the playback system of FIG. 2 to provide content items from alternative sources.

FIG. 4 is a flowchart showing one embodiment of a process flow 400 that may be executed by the playback system 110 (e.g., the content distribution 122 and user interface 120 modules thereof) to provide content items from alternative sources. At 402, the content distribution module 122 may receive an indication of the digital content library. The digital content library may include content items that the playback system 110 (e.g., its associated content distribution service) is authorized to stream to users 103. For example, content distribution service may have obtained appropriate license rights to stream the digital content library to users 103. Content items making up the digital content library may be stored at the data store 109 and/or at the data stores 108 of the various content distribution systems 104.

At 404, the content distribution module 122 may receive and/or derive potentially available content items. Potentially available content items are content items that are potentially available to be provided to a user 103 (e.g., from a user device 102 associated with a user 103, from a content service 113 associated with the user 103, from a content store 112, etc.). In various embodiments, potentially available content items are not part of the digital content library. For example, the content provider service associated with the playback system 110 may not be authorized to stream the potentially available content items generally to their users.

Potentially available content items from a content store 112, in some embodiments, are common across all users 103. The content distribution module 122 may receive one or more content item catalogs indicating content items offered by various content stores 112 to the content service provider. In various embodiments, some potentially available content items vary from user-to-user. For example, content items stored on the user device 102 of a user 103 and/or at a content service account of the user 103 may be potentially available to that user 103 and not to other users. Accordingly, in some embodiments, the content distribution module 122 may derive the potentially available content items. For example, when a user 103 logs-in to the playback system 110 and/or requests content items, the content distribution module 122 may query the user device 102 and/or any content services 113 known to the playback system 110 as associated with the user 103.

At 406, the playback system 110 may provide a user 103 with an interface indicating content items from the digital content library and content items from the potentially available content items. For example, the content distribution module 122 may provide the user interface module 120 with the digital content library and the potentially available content items. The user interface module 120 may, in turn, populate the user interface 126 with indications of content items from both sets. For example, referring to FIG. 3, the user interface module 120 may populate the screen New Releases filed 308, the Suggestions field 304, and results from the Search field 302 with content items from the digital library as well as potentially available content items. In some embodiments, instead of deriving potentially available content items in advance, the playback system 110 provides the user 103 with general indications of content items and then determines whether a selected content item is available after selection.

At 408, the playback system 110 (e.g., user interface module 120) may receive an indication of a content item from the user 103. The selected content item may be from the digital content library and/or from the potentially available content items. The content distribution module 122 may provide the selected content item to the user 103 at 41. If the selected content item is part of the digital content library, then the content distribution module 122 may provide the content item to the user 103 as otherwise described herein. If the selected content it is not part of the digital content library, then the content distribution module 122 may provide the content item to the user 103 from an alternate source, as described herein.

Figure 5:
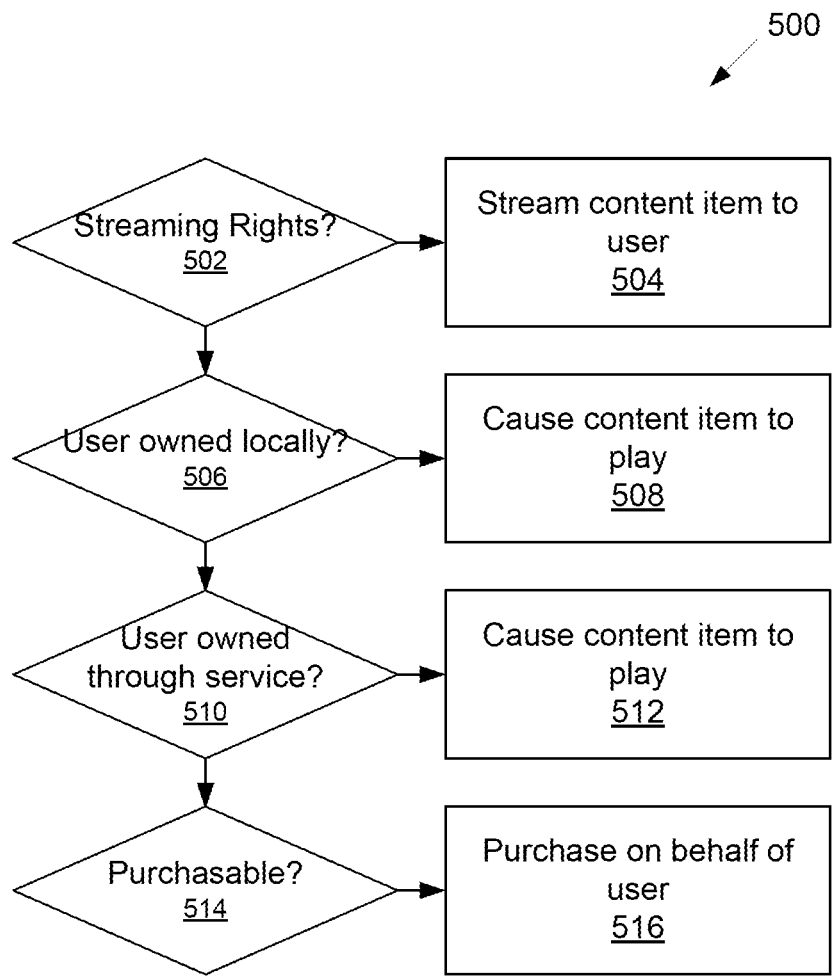
FIG. 5 is a flow chart showing one example embodiment of a process flow that may be executed by the playback system of FIG. 2 to provide a content item to a user.

FIG. 5 is a flow chart showing one example embodiment of a process flow 500 that may be executed by the playback system 110 (e.g., the content distribution system 122 thereof) to provide a selected content item to a user 103. For example, FIG. 5 shows one example embodiment for executing the action 410 from the process flow 400. At 502, the content distribution module 122 may determine whether the playback system 110 (e.g., the content distribution service associated with the playback system 110) is authorized to stream the selected content item to the user 103. For example, the content distribution module 122 may determine whether the selected content item is part of the digital content library or a potentially available content item. If the playback system 110 is authorized to stream the selected content item to the user 103, then it may do so at 504. As described herein, the selected content item may be streamed from the playback system 110 and/or from a content distribution system 104.

At 506, the content distribution module 122 may determine if the selected content item is present locally at a user device 102 associated with the requesting user 102. For example, the content distribution module 122 may query the user device 102 via the client 133 to determine if the local items 134 comprise the selected content item. If yes, then the content distribution module 122 may cause the selected content item to play at 508. The content distribution module 122 may instruct the client 133 to play back the content item from the user device 102. In some embodiments, the playback system 110 may direct a licensing fee to a rights holder associated with the content item upon playing the content item from the user machine 102.

At 510, the content distribution module 122 may determine whether the selected content item is owned by the user 103 through a content service or digital locker service 113. For example, the user 103 may provide the playback system 110 with authentication data allowing the playback system 110 to log-in to one or more content services 113 on behalf of the user 103. The authentication data may be provided by the user 103 to the playback system 110. Also, in some embodiments, the playback system 110 may request that the content system 113 prompt the user to authorize access by the playback system 110. The various content services 113 may provide the content distribution module 122 with an indication of whether the selected content item is stored at the content service 113 and accessible to the user. If so, the content distribution module 122 may, at 512, cause the selected content item to play at the user device 102. This may be accomplished in several different ways, as illustrated by the process flow 600 described below with respect to FIG. 6.

At 514, the content distribution module 122 may determine if the selected content item is purchasable, for example, from a content store 112. If so, the content distribution module 122 may, at 516, purchase the selected content item on behalf of the user 103 and provide the selected content item to the user. One example method for purchasing and providing the selected content item to the user is provided below and illustrated by the process flow 700 of FIG. 7. In various embodiments, the selected content item will be identified at one of actions 502, 506, 510 or 514 and provided to the user 103 as described herein. It will be appreciated, however, that content provider services, in some embodiments, may access alternative content item sources in addition to those described herein. Also, it will be appreciated that not all of the content item sources described herein will be utilized in every embodiment. For example, the content distribution module 122 may limit potentially available content items to any one or any combination of the sources described herein.

Figure 6:
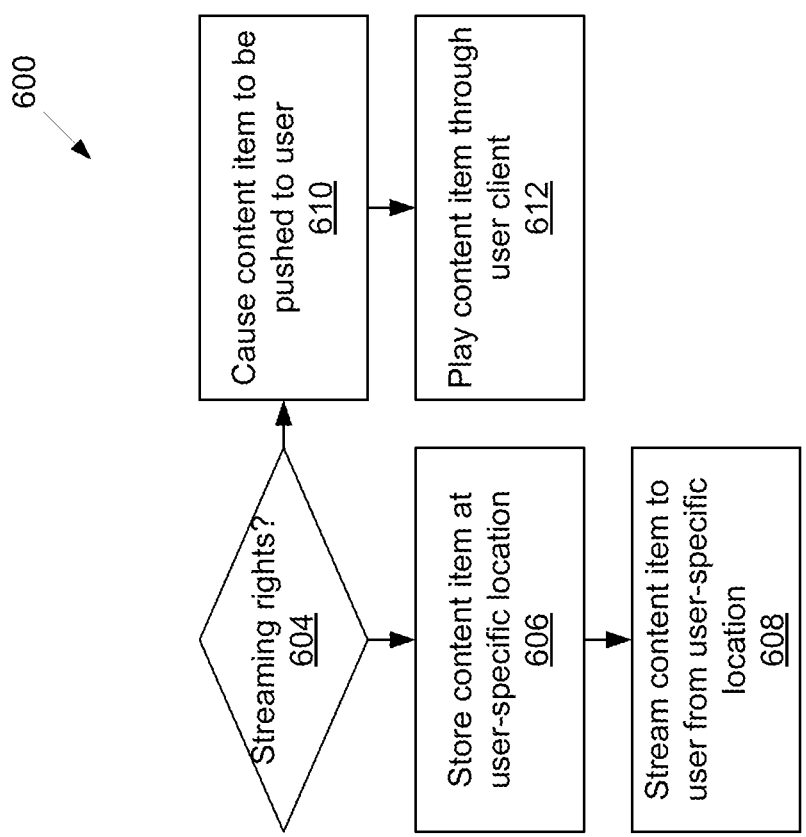
FIG. 6 is a flow chart showing one embodiment of a process flow that may be executed by the playback system of FIG. 2 to provide a selected content item to a user when the selected content item is obtained via a content or digital locker service.

FIG. 6 is a flow chart showing one embodiment of a process flow 600 that may be executed by the playback system 110 (e.g., the content distribution module 122 thereof) to provide a selected content item to a user when the selected content item is obtained via a content or digital locker service 113. For example, the process flow 600 illustrates one example embodiment for executing action 512 of the process flow 500. At 604, the content distribution module 122 may determine whether the selected content item is associated with rights that allow it to be streamed to the user 103, either by the content service 113 and/or by the playback system 110. If yes, the distribution module 122 may receive the selected content item and store it at a portion of the data storage 109 uniquely associated with the user 103 at 606. At 608, the distribution module 122 may stream the selected content item to the user 103 from the data storage 109. Alternatively, instead of receiving the selected content item and streaming it to the user 103, the content distribution module 122 may request that the content service 113 itself stream the selected content item to the user 103, for example, by streaming the selected content item to the user device 102 to be played through the client 133.

If the selected content item is not associated with rights that allow it to be streamed to the user 103, then the content distribution module 122 may cause the selected content item to be pushed to the user 103, via the user device 102. For example, the content distribution module 122 may request that the content service 113 push the selected content item to the user device 102. Also, in some embodiments, the selected content item may be received by the playback system 110 (e.g., the content distribution module 122) and subsequently pushed, by the content distribution module to the user device 102. At 612, the content distribution module 122 may instruct the user device (e.g., the client 133) to play the selected content item from the local tracks 134 stored at the user device 102.

Figure 7:
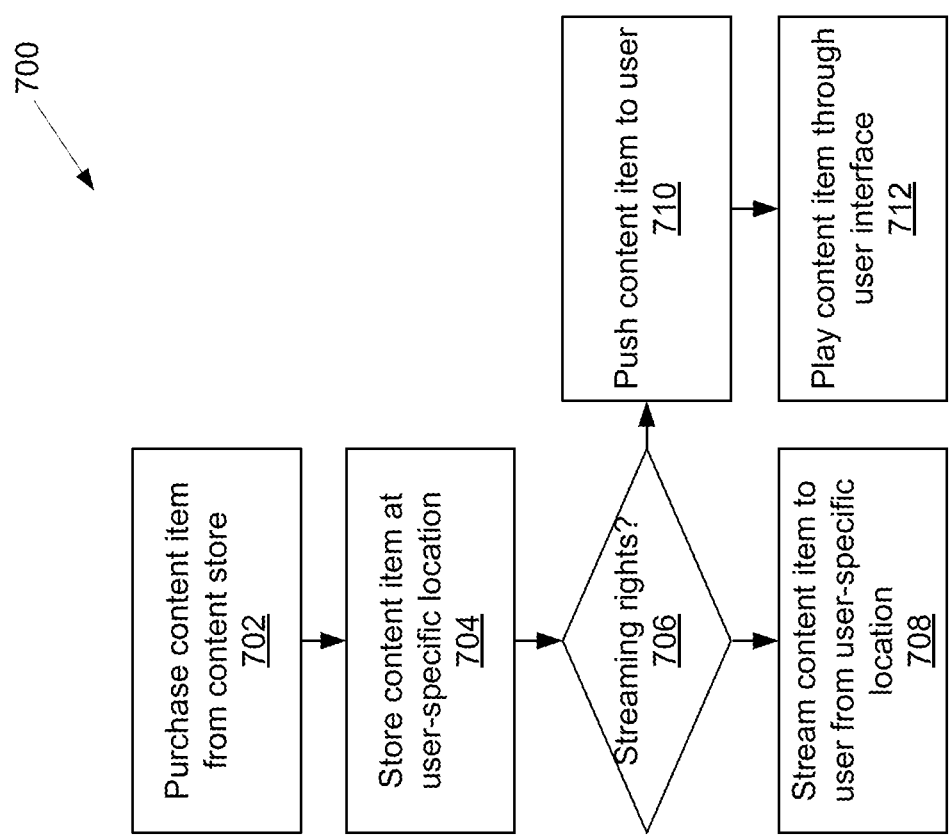
FIG. 7 is a flow chart showing one embodiment of a process flow that may be executed by the playback system to provide a selected content item to the user when the selected content item is purchased from a content store.

FIG. 7 is a flow chart showing one embodiment of a process flow that may be executed by the playback system 110 (e.g., the content distribution module 122 thereof) to provide a selected content item to the user 103 when the selected content item is purchased from a content store 112. At 702, the playback system 110 may purchase the selected content item from a content store 112. The purchase may be arranged in any suitable manner. For example, the playback system 110 may first select a content store 112 from which to make the purchase. In one example, the playback system 110 first determines whether the selected content item is available from a wholesale content store 112 or other content store 112 with which the content service provider has a pre-existing agreement. It will be appreciated that content items purchased in this manner may be less expensive than retail. For example, the content service provider may negotiate favorable rates. If the selected content item is not available from a wholesale content store 112, then the playback system 110 may locate a retail content store 112 from which the selected content item is available. If the selected content item is available from more than one content store 112, the playback system 110 may select the content store that provides the best price. After a content store 112 is selected, the playback system may open an account with the content store 112, where the account is specific to the requesting user 103. In some embodiments, various content stores 112 support application program interfaces (API's) that allow the playback system 110 to: interrogate stores 112 to determine whether they carry particular content items, interrogate stores 112 to determine their costs for different content items; open accounts for users 103; purchase and download content items, etc.

At 704, the content distribution module 122 may store the selected content item (now purchased) at a portion or location at the data storage 109 that is uniquely associated with the user 103. At 706, the content distribution module 122 may determine whether the selected content item is associated with rights that allow it to be streamed to the user 103. This may be determined, for example, based on terms of purchase between the playback system 110 and the content store 112 and/or by license agreements between the content provider system and various rights-holders in the selected content item. If the selected content item is associated with rights that allow it to be streamed to the user 103, then the content distribution module 122 may stream the selected content item to the user 103 from the data storage 109 at 708.

If the selected content item is not associated with rights that allow it to be streamed to the user 103, then the content distribution module 122 may, at 710, push the selected content item to the user device 102. At 712, the content distribution module 122 may play the selected content item through the client 133. For example, the content distribution module 122 may instruct the client 133 to play the selected content item from the local tracks 134.

Once a content item is purchased on behalf of a user 103, it may not be necessary for the playback system 110 to purchase the content item for that user 103 again. Instead, when the user 103 next requests the purchased content item, the content distribution module may respond by causing the content item to play, as described above with respect to 706, 708, 710, 712. In various embodiments, content items purchased from a content item store 112 for a first user are used only for that first user and are not re-used.

The features and advantages described in the specification are not all inclusive and, in particular, many additional features and advantages will be apparent to one of ordinary skill in the art in view of the drawings, specification, and claims. The language used in the specification has been principally selected for readability and instructional purposes, and may not have been selected to delineate or circumscribe the disclosed subject matter.

The figures and the following description relate to example embodiments of the invention by way of illustration only. Alternative example embodiments of the structures and methods disclosed here may be employed without departing from the principles of what is claimed.

Any patent, publication, or other disclosure material, in whole or in part, that is said to be incorporated by reference herein is incorporated herein only to the extent that the incorporated materials do not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Reference in the specification to "one example embodiment," "various example embodiments," or to "an example embodiment" means that a particular feature, structure, or characteristic described in connection with the example embodiments is included in at least one example embodiment of the invention. The appearances of the phrase "in one example embodiment" or "a preferred example embodiment" in various places in the specification are not necessarily all referring to the same example embodiment. Reference to example embodiments is intended to disclose examples, rather than limit the claimed invention.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of actions (instructions) leading to a desired result. The actions are those requiring physical manipulations of physical quantities.

Usually, though not necessarily, these quantities take the form of electrical, magnetic or optical signals capable of being stored, transferred, combined, compared and otherwise manipulated. It is convenient, at times, principally for reasons of common usage, to refer to these signals as bits, values, elements, symbols, characters, terms, numbers, or the like. Furthermore, it is also convenient, at times, to refer to certain arrangements of actions requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers and computer systems referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method actions. The required structure for a variety of these systems will appear from the above description. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been particularly shown and described with reference to a preferred example embodiment and several alternate example embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A system for providing content items to users, the system comprising:
a computer system comprising at least one hardware processor and operatively associated data storage, wherein the computer system is programmed to:
provide to a first user an indication of a plurality of available content items, wherein the providing comprises:
receiving an indication of content items that a content provider service is authorized to transmit to users;
receiving an indication that an additional content item that the content provider service is not authorized to transmit to users is available from at least one alternate source, wherein the plurality of available content items comprises the content items that the content provider service is authorized to transmit to users and the content item that the content provider service is not authorized to transmit to users;
after receiving the indication that the additional content item is available from the at least one alternate source, generating an interface comprising a representation of the content items that the content provider service is authorized to transmit to users and the additional content item, wherein the plurality of available content items comprises the content items that the content provider service is authorized to transmit to users and the additional content item; and
transmitting the interface to the first user;
receive from the first user an indication of a first content item selected from the plurality of content items;
determine that the content provider service is not authorized to transmit the first content item to the first user;
identify a first alternate source for the first content item selected from the at least one alternate source; and
initiate playback of the first content item to the first user from the first alternate source.

2. The system of claim 1, wherein the first alternate source for the first content item comprises a first user device associated with the first user, and wherein initiating playback of the first content item comprises initiating playback of the first content item from the first user device.

3. The system of claim 1, wherein the first alternate source for the first content item comprises a content service storing a plurality of content items to which the first user has playback rights.

4. The system of claim 3, wherein initiating playback of the first content item comprises sending a request that the content service transmit the first content item to the first user.

5. The system of claim 3, wherein initiating playback of the first content item comprises:
downloading the first content item from the content service;

storing the content item to a portion of the data storage associated with the first user; and transmitting the first content item to the first user from the data storage.

6. The system of claim 1, wherein the first alternate source for the first content item comprises a content store, and wherein initiating playback of the first content item comprises purchasing a copy of the first content item from the content store.

7. The system of claim 6, wherein initiating playback of the first content item further comprises:

storing the content item to a portion of the data storage associated with the first user; and transmitting the first content item to the first user from the data storage.

8. The system of claim 6, wherein initiating playback of the first content item further comprises:

pushing the first content item to a first user device associated with the first user; and initiating playback of the first content item from the first user device.

9. The system of claim 1, wherein identifying the first alternate source for the first content item comprises:

determining whether the first content item is available at a first user device associated with the user;

determining whether the first content item is available from at least one content service associated with the first user;

determining whether the first content item is available from at least one content store; and selecting at least one source selected from the group consisting of the first user device, the at least one content service and the at least one content store.

10. A computer-implemented method for providing content items to users, the method comprising:

providing, by a computer system and to a first user, an indication of a plurality of available content items, wherein the computer system comprises at least one hardware processor and operatively associated memory, and wherein the providing comprises:

receiving an indication of content items that a content provider service is authorized to transmit to users;

receiving an indication that an additional content item that the content provider service is not authorized to transmit to users is available from at least one alternate source, wherein the plurality of available content items comprises the content items that the content provider service is authorized to transmit to users and the content item that the content provider service is not authorized to transmit to users;

after receiving the indication that the additional content item is available from the at least one alternate source, generating an interface comprising a representation of the content items that the content provider service is authorized to transmit to users and the additional content item, wherein the plurality of available content items comprises the content items that the content provider service is authorized to transmit to users and the additional content item; and transmitting the interface to the first user;

receiving, by the computer system and from the first user, an indication of a first content item selected from the plurality of content items;

determining, by the computer system, that the content provider service is not authorized to transmit the first content item to the first user;

identifying, by the computer system, a first alternate source for the first content item selected from the at least one alternate source; and initiating, by the computer system, playback of the first content item to the first user from the first alternate source.

11. A system for providing content items to users, the system comprising:

a computer system comprising at least one hardware processor and operatively associated data storage, wherein the computer system is programmed to:

provide to a first user, an indication of a plurality of available content items, wherein the providing comprises:

receiving an indication of content items in a digital library of a content provider service;

receiving an indication that an additional content item that is not in the digital library is available from at least one alternate source, wherein the plurality of available content items comprises the content items in the digital library and the content item that is not in the digital library;

after receiving the indication that the additional content item is available from the at least one alternate source, generating an interface comprising a representation of the content items in the digital library and the additional content item, wherein the plurality of available content items comprises the content items in the digital library and the additional content item; and transmitting the interface to the first user;

receive from the first user, an indication of a first content item selected from the plurality of content items;

determine that the first content item is not in the digital library;

identify a first alternate source for the first content item selected from the at least one alternate source; and initiate playback of the first content item to the first user from the first alternate source.

12. The system of claim 11, wherein the first alternate source for the first content item comprises a first user device associated with the first user, and wherein initiating playback of the first content item comprises initiating playback of the first content item from the first user device.

13. The system of claim 11, wherein the first alternate source for the first content item comprises a content service storing a plurality of content items to which the first user has playback rights.

14. The system of claim 13, wherein initiating playback of the first content item comprises sending a request that the content service transmit the first content item to the first user.

15. The system of claim 13, wherein initiating playback of the first content item comprises:

downloading the first content item from the content service;

storing the content item to a portion of the data storage associated with the first user; and transmitting the first content item to the first user from the data storage.

16. The system of claim 11, wherein the first alternate source for the first content item comprises a content store, and wherein initiating playback of the first content item comprises purchasing a copy of the first content item from the content store.

17. The system of claim 16, wherein initiating playback of the first content item further comprises:

storing the content item to a portion of the data storage associated with the first user; and transmitting the first content item to the first user from the data storage.

18. The system of claim 16, wherein initiating playback of the first content item further comprises:

pushing the first content item to a first user device associated with the first user; and initiating playback of the first content item from the first user device.

19. The system of claim 11, wherein identifying the first alternate source for the first content item comprises:

determining whether the first content item is available at a first user device associated with the user;

determining whether the first content item is available from at least one content service associated with the first user;

determining whether the first content item is available from at least one content store; and selecting at least one source selected from the group consisting of the first user device, the at least one content service and the at least one content store.

\* \* \* \* \*